United States Patent [19]

Patel

[11] Patent Number: 4,511,768

[45] Date of Patent: Apr. 16, 1985

[54] MOUNTING ARRANGEMENT FOR ALTERING A MICROPHONE'S FREQUENCY RESPONSE

[75] Inventor: Bakulesh B. Patel, Coral Springs, Fla.

[73] Assignee: Motorola, Inc., Schaumburg, Ill.

[21] Appl. No.: 437,719

[22] Filed: Oct. 29, 1982

[51] Int. Cl.[3] .............................................. H04M 1/04

[52] U.S. Cl. ............................ 179/146 R; 179/111 E; 179/146 E; 179/181 R; 179/102; 29/594; 181/144

[58] Field of Search ........... 179/146 R, 146 E, 100 L, 179/121 D, 109, 111 E, 181 R, 121 R, 102, 81 B; 181/144; 29/594

[56] References Cited

U.S. PATENT DOCUMENTS

| | | | |
|---|---|---|---|
| 1,196,562 | 8/1916 | Lynch | 179/102 |
| 1,484,509 | 2/1924 | Leach | 179/123 |
| 1,827,283 | 1/1927 | De Forest | 179/115.5 R |
| 1,856,749 | 5/1932 | Desbriere | 181/163 |
| 2,358,099 | 9/1944 | Polk | 181/160 |
| 2,385,279 | 9/1945 | Hopkins | 179/81 B |
| 3,345,607 | 10/1967 | Nelkin et al. | 181/148 |
| 3,833,085 | 9/1974 | Thomasen | 179/181 R |
| 3,943,304 | 3/1976 | Piribauer | 179/111 E |

FOREIGN PATENT DOCUMENTS

| | | | |
|---|---|---|---|
| 716193 | 9/1954 | United Kingdom | 179/146 R |

OTHER PUBLICATIONS

"Apply Electret Microphones to Voice-input Designs", Ture Heline, Gentex Corp. EDN, Sep. 2, 1981, pp. 225-230.

Motorola Manual—HT220 Series—Handie-Talkie FM Radio, Mar. 24, 1975, pp. 18-21.

IEEE Transactions on Acoustics, Speech and Signal Processing "The Enhancement of Speech Intelligibility in High Noise Levels by High-Pass Filtering Followed by Rapid Amplitude Compression"—Russell J. Niederjohn and James H. Grotelueschen, Member, IEEE, vol. ASSP-24, No. 4, Aug. 1976.

*Primary Examiner*—Gene Z. Rubinson
*Assistant Examiner*—Danita R. Byrd
*Attorney, Agent, or Firm*—Joseph T. Downey; Edward M. Roney; James W. Gillman

[57] ABSTRACT

A microphone mounting arrangement for altering the microphone's audio frequency response characteristic comprises a microphone disposed within an enclosure bounded by a loudspeakers cone on one side and a flexible diaphragm on the other side. The microphone is preferably mounted to a web-like mounting structure which is sandwiched between the loudspeaker and the flexible diaphragm. The resonant characteristic of the enclosure selectively alters the intensity of soundwaves impinging upon the diaphragm so that enclosed microphone's frequency response is altered. Improved intelligibility in high noise level environment is thereby attained.

17 Claims, 5 Drawing Figures

MOUNTING ARRANGEMENT FOR ALTERING A MICROPHONE'S FREQUENCY RESPONSE

BACKGROUND OF THE INVENTION

1. Field of the Invention

This invention relates generally to the field of mechanical techniques for altering the audio frequency response of a microphone and more particularly to a microphone mounting arrangement which utilizes a resonant chamber, bounded by a speaker and a resilient diaphragm, to alter a microphone's audio frequency response in a radio transceiver.

2. Background of the Invention

A significant problem encountered in the development of two-way communication systems is that of improving the intelligibility of speech when the listener or transmitter is in a high noise level environment. The listener might encounter difficulty understanding a transmitted speech message in the presence of noises such as automobile traffic, factory and industrial machinery, farm, and military machinery noises. The audio in such a communication system is usually band limited between approximately 300 Hz and 3 KHz, and fortunately most such noises are predominently in the lower end of this frequency range, whereas the information necessary for good speech intelligibility is predominantly in the upper portion of this frequency range. It is well kwown in the art that this is due primarily to the greater significance of the second formant relative to the first formant for the intelligibility of speech. It has been well established that high pass filtering by electrical circuits of the transmitted audio signals in a two-way communication system is an effective method of improving the intelligibility in a high noise environment.

The intelligibility improvement attainable by electrical high pass filtering of the transmitted audio in the 300 to 3000 Hz range in order to emphasize the higher frequencies relative to the lower and middle frequencies is well documented in papers such as "The Enhancement of Speech Intelligibility in High Noise Levels by High Pass Filtering Followed by Rapid Amplitude Compression" by Russell J. Niederjohn and James H. Grotelueschen appearing in Volume ASSP—24, Number 4, August 1976 of the *IEEE Transaction on Acoustics, Speech and Signal Processing.* FIG. 1 of that article clearly shows that, for one example, in a 90 DB sound pressure level environment speech intelligibility improved from approximately 38% recognition to as much as approximately 82% recognition at a 0 DB signal to noise ratio as a result of adding electrical high pass filtering to the transmitted audio signal.

SUMMARY OF THE INVENTION

It is an object of the present invention to provide a microphone mounting arrangement for altering the audio frequency response characteristics of a microphone.

It is another object of the present invention to provide a microphone mounting arrangement which mechanically improves speech intelligibility thereby allowing for a reduction in the quantity of electronic components necessary to effect the audio shaping.

It is another object of the present invention to provide a water-sealed microphone mounting arrangement which protects a microphone and speaker from water damage while allowing the escape of humidity from the housing.

It is another object of the present invention to provide a microphone mounting arrangement which effectively utilizes wasted volume within a loudspeaker's cone to house a microphone.

It is another object of the present invention to provide a microphone mounting arrangement which actually improves the sensitivity and intelligibility characteristics of a microphone.

It is a further object of the present invention to provide a microphone mounting arrangement which simulates the frequency response of a dynamic microphone with a low cost electret microphone having a less desirable frequency response for high intelligibility communication.

The present invention is directed towards a microphone mounting arrangement for mechanically altering the audio frequency response characteristics for the microphone. A loudspeaker cone cooperates with a flexible diaphragm to bound a sealed resonant enclosure. A microphone is disposed within that enclosure and is held in place by a mounting structure which holds the microphone in a fixed physical relationship with the diaphragm and the loudspeaker's cone.

The features of the invention believed to be novel are set forth with particularity in the appended claims. The invention itself however, both as to organization and method of operation, together with further objects and advantages thereof, may be best understood by reference to the following description taken in conjunction with the accompanying drawings.

DETAILED DESCRIPTION OF THE PREFERRED EMBODIMENT

Figure 1:
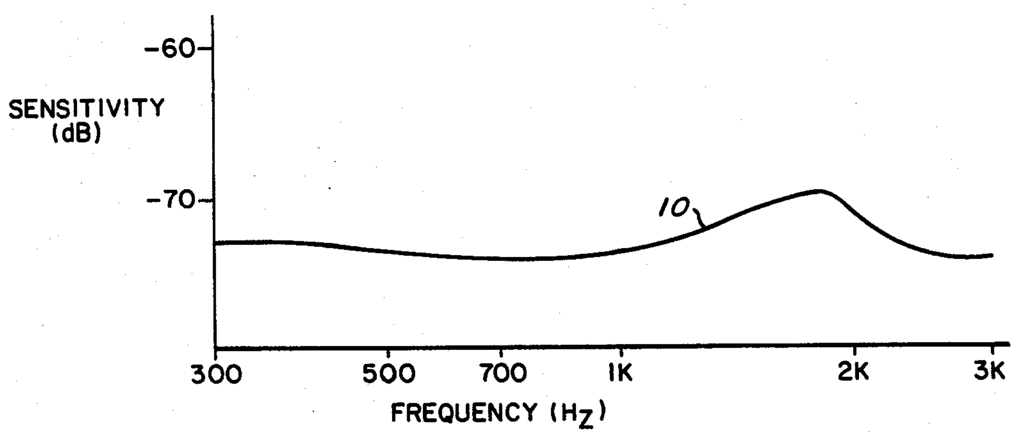
FIG. 1 is a frequency response plot of a typical electret microphone.

A typical frequency response curve for an electret microphone is shown as curve 10 of FIG. 1 which is a plot of sensitivity in DB vs. frequency in Hz. Curve 10 is a reasonably flat frequency response curve which would be suitable for high fidelity use. However, as discussed previously a flat frequency response between 300 Hz and 3 KHz is not desirable for good intelligibility in a high noise environment. Therefore, this response should be altered in order to use the associated microphone in a high intelligibility communication systems such as a radio transceiver.

The many advantages of the electret microphones over other types of microphones are discussed in the art. Some of the principal advantages of electret microphones are mechanical shock resistance, small physical size, immunity to electromagnetic interference, light weight and low cost. However, the lowest cost and smallest size electret microphones are typically available with the flat frequency response shown in FIG. 1.

Figure 2:
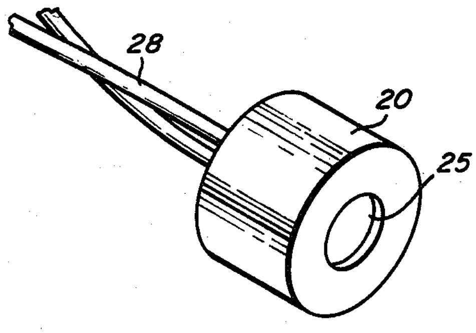
FIG. 2 perspective view illustrates the microphone used in the preferred embodiment of the present invention.
Figure 3:
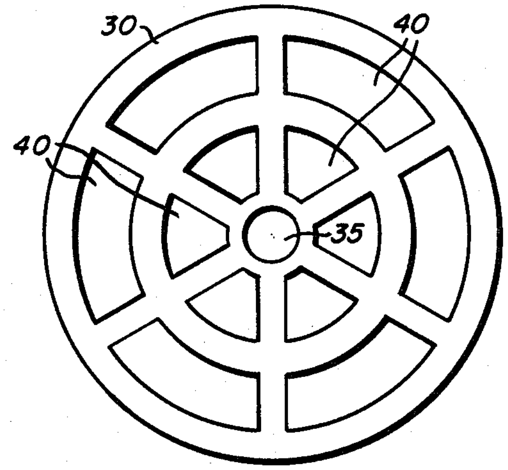
FIG. 3 is a detailed drawing of the microphone support frame.

Turning to FIG. 2, the microphone used in the mounting arrangement of the present invention is shown. Microphone 20, which is a cylindrical structure having a sound port 25 at one end and provisions for electrical connections such as wires 28 at the other end, is mounted to the center of a support frame 30 which is more clearly shown in FIG. 3. In the preferred embodiment microphone 20 would be press-fitted with an interference fit into aperture 35 of frame 30 but this is not intended to the limiting. It will be evident to those skilled in the art that many suitable mounting schemes are available for attaching a microphone to a frame and microphones having different shape factors will require different mounting schemes. Preferrably frame 30 would be composed of a rigid material such as plastic or fiberglass but any rigid material would be equally operative. Preferrably frame 30 would be of a web-like configuration having numerous apertures 40 throughout the structure to make the frame substantially acoustically transparent.

Figure 4:
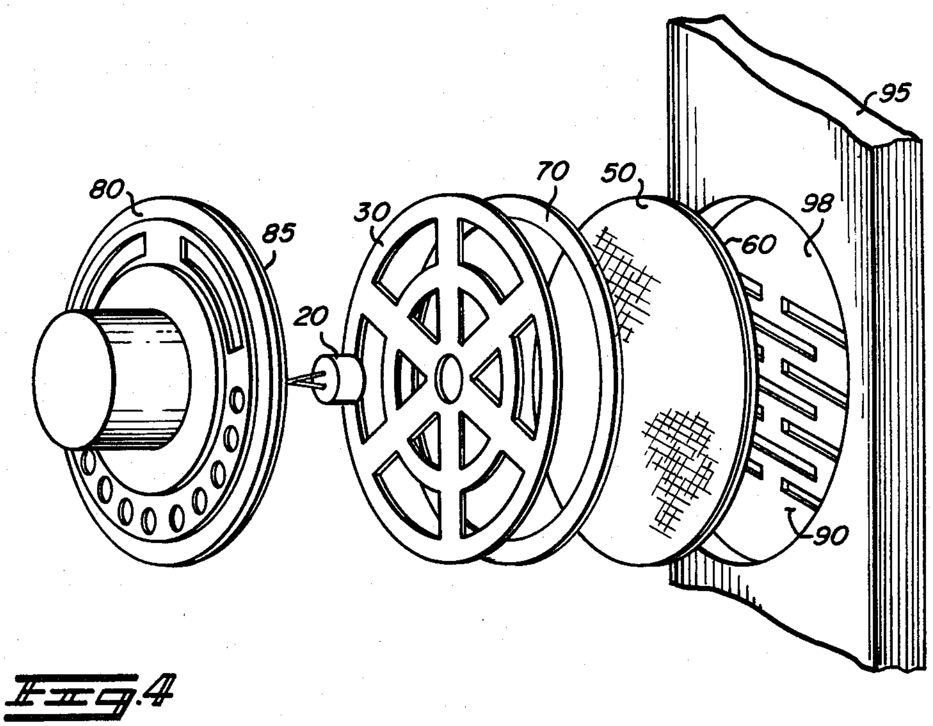
FIG. 4 is an exploded view illustrating the mounting arrangement of the present invention.

Referring now to FIG. 4, a flexible diaphragm 50 is attached to a rigid mounting ring 60 at its perimeter. This ring mounted flexible diaphragm is attached to a front surface of support frame 30 and separated therefrom by gasket 70 which is mounted to the perimeter of support frame 30.

A loudspeaker 80 having a speaker cone 85 is mounted to the opposite surface of support frame 30 to entrap microphone 20 within a sealed resonant chamber bounded on one surface by flexible diaphram 50 and on the other surface by speaker cone 85. Preferrably ring 60, frame 30, gasket 70 and loudspeaker 80 all have approximately the same diameter. This structure would normally be mounted behind a speaker grille 90 which is part of an overall housing 95 for the communications transceiver or device of interest. Housing 95 preferrably has a pocket 98 for receiving the speaker assembly but this is not intended to be limiting.

This mounting arrangement is easily assembled by first inserting ring mounted diaphragm 50 within pocket 98 of housing 95. Gasket 70 is then placed within the pocket 98. Next the frame mounted microphone is inserted within pocket 98 so that one surface of the frame is now covered by flexible diaphragm 50. Loudspeaker 80 is then inserted within pocket 98 in order to enclose microphone 20 within an enclosure bounded by diaphragm 50 and speaker cone 85. Preferrably, microphone 20 would lie substantially co-axially with loudspeaker 80. It will be understood by those skilled in the art that these components must be secured into place in some suitable manner. In the preferred embodiment, a suitable bracket (not shown) is placed around the rear of loudspeaker 80 and screwed to housing 95 in order to hold the arrangement in place by compressive force thereon.

When loudspeaker 80 of this assembly is electrically excited and thus operated as a loudspeaker, sound energy created by the loudspeaker cone 85 readily passed though the aperture 40 of frame 30 and sets flexible diaphragm 50 into vibration thereby transferring sound energy to the listener. Diaphragm 50 should be attached to mounting ring 60 without radial tension and sufficiently separated from the inner surface of speaker grille 90 and support frame 30 to allow free vibration of diaphram 50 without touching speaker grille 90 or frame 30. If diaphragm 50 touches frame 30, microphone 20, or speaker grill 90 while vibrating in response to the loudspeaker cones' vibrations an undesirable buzzing sound would be created.

Conversely, when operating in the transmit mode, wherein the microphone is being utilized and the loudspeaker cone 85 is not being electromagnetically excited, sound waves pass through grille 90 and impinge upon diaphragm 50. The vibration of diaphragm 50 induces vibrations upon speaker cone 85. The resonant characteristics of the enclosure bounded by diaphragm 50 and speaker cone 85 alters the relative intensity of sound waves impinging upon microphone 20 to produce an altered frequency response characteristic such as that of curve 100 of FIG. 5 in the preferred embodiment. Of course it is understood by those skilled in the art that the exact shape of curve 100 depends upon a number of variables including the base resonant frequency of the loudspeaker, volume of the enclosures, diaphragm properties, etc.

In the preferred embodiment of the present invention a two-inch loudspeaker having a base resonant frequency of approximately 600 Hz is used in conjunction with electret microphone 20 manufactured by Primo Company Limited, Tokyo, Japan, Model EM-76. The flexible diaphragm 50 is preferrably made of a rubberized silk material which is mounted 0.030 inches the approximate thickness of gasket 70, from the support frame 30 which is itself 0.030 inches thick.

Figure 5:
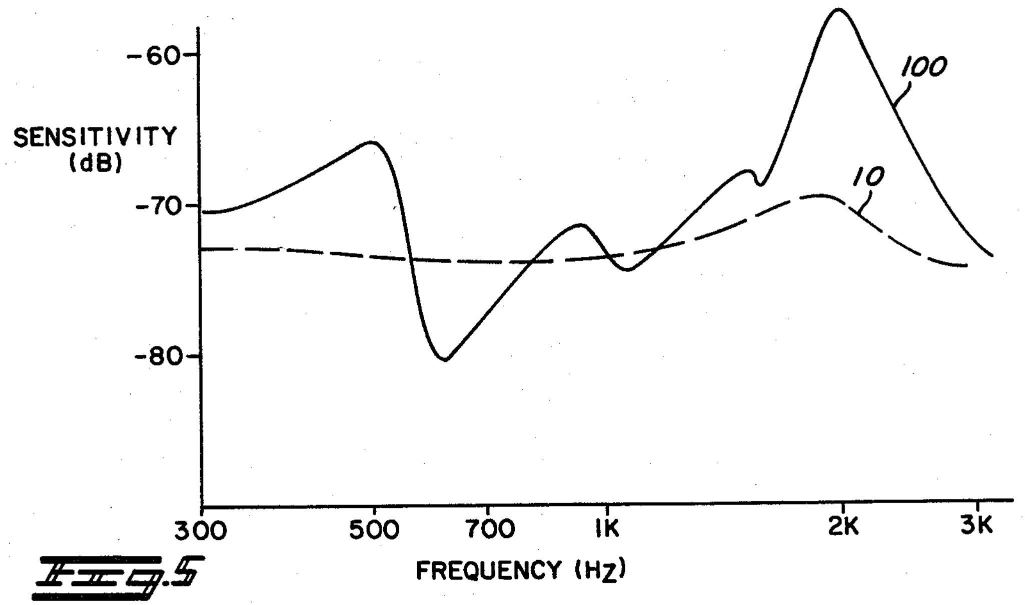
FIG. 5 is an audio frequency response plot of the microphone embodied in the mounting arrangement of the present invention superimposed with FIG. 1.

The resulting microphone's frequency response characteristic utilizing the present invention is shown as curve 100 in FIG. 5. The frequency response curve 10 of the microphone without the present mounting structure is shown in broken lines for reference. It should be noted that the response curve is no longer flat and smooth but has a number of small peaks and valleys and exhibits an overall response between approximately 600 Hz and 2000 Hz which mechanically simulates an electrical high pass filtering effect. Tests have shown that this type of mounting structure results in substantially improved intelligibility. It should also be noted that the overall sensitivity of the microphone is increased dramatically in the frequency range between 1500 Hz and 2500 Hz where second formant, which contains the vast majority of speech information, is contained.

The peaks and valleys associated with curve 100 also have the effect of simulating the frequency response curve for a typical electro-dynamic microphone of the type which is used in many communications systems. These peaks and valleys produce a sound characteristic which is similar to that for an electro-dynamic microphone which the user may have become accustomed to hearing. This mounting scheme therefore has the additional benefit of simulating the characteristics of the more expensive and less advantageous dynamic microphones to which the user has become accustomed.

The improved frequency response characteristics of this mounting arrangement have the additional benefit of size reduction, reduced electronic component count and improved electrical efficiency. Since for the present invention the effect of the high pass filtering is essentially accomplished mechanically, the number of electronic components used for audio frequency shaping can be reduced. Also, the wasted physical volume within the cone of the speaker is more efficiently utilized to house a microphone cartridge. Reduction in electronic circuits also results in an improved electrical efficiency by consuming less power. In addition, since the microphone's sensitivity is increased, the signal-to-noise ratio of the microphone would also improve.

In the preferred embodiment, diaphragm 50 is composed of style 7202 Reevecoate® manufactured by Reeves Brothers, Inc. of Rutherfordton, N.C. This is a waterproof Vistanex® coated silk fabric which has a thickness of approximately 0.003 inches and does not allow air to pass through it.

Other materials are available which do allow air to pass through while repelling water. At audio frequencies air cannot pass through such materials fast enough to prevent them from vibrating in response to the speaker cones vibration. Many materials with such characteristics are readily available.

The breathing properties of some diaphragm material coupled to similar breathing properties of a typical loudspeaker cone allow a watersealed electronic enclosure, such as a portable two-way radio, to be completely waterproof while providing for air pressure equalization from the equipment housing 95 to the outside atmosphere. Any water vapor from internal condensation may also freely escape through the speaker cone and diaphragm avoiding possible water buildup within the housing which could cause electronic short circuits.

Thus, it is apparent that in accordance with the present invention, a method and apparatus that fully satisfies the objects aims and advantages is set forth above. While the invention has been described in conjunction with specific embodiments, it is evident that many alternatives, modifications and variations will be apparent to those skilled in the art in light of the foregoing description. Accordingly it is intended that the present invention embrace all such alternatives modifications and variations as fall within the spirit and broad scope of the appended claims.

What is claimed is:

1. A microphone mounting arrangement for mechanically altering the audio frequency response characteristics of the microphone, comprising:

a loudspeaker having a cone;

a flexible diaphragm mechanically coupled to said cone so that said cone and said diaphragm substantially bound a resonant enclosure;

a microphone disposed within said enclosure; and mounting means for mounting said microphone in a fixed physical relationship with said diaphragm and said loudspeaker.

2. The arrangement of claim 1, wherein said diaphragm is mounted to a rigid ring having a diameter approximately equal to the diameter of said loudspeaker.

3. The arrangement of claim 2, wherein said mounting means includes a rigid web-like frame disposed between said loudspeaker and said diaphragm.

4. The arrangement of claim 3, wherein said microphone is attached to said web-like frame.

5. The arrangement of claim 4, wherein said microphone is substantially coaxial with the cone of said loudspeaker.

6. The arrangement of claim 5, wherein said diaphragm is composed of a fabric impregnated with a waterproofing material.

7. The arrangement of claim 6, wherein said microphone is an electret microphone cartridge.

8. The arrangement of claim 5, wherein said diaphragm is composed of rubberized silk.

9. The arrangement of claim 8, wherein said microphone is disposed approximately 0.030 inches from said diaphragm.

10. The arrangement of claim 9, further including a speaker grille disposed adjacent and substantially parallel to said diaphragm.

11. The arrangment of claim 10, wherein said diaphragm is approximately 0.030 inches from said grille.

12. The arrangement of claim 11, wherein said loudspeaker has a diameter of approximately two inches.

13. The arrangement of claim 12, wherein said loudspeaker has a bass resonance of approximately 600 Hz.

14. A microphone mounting arrangement for mechanically altering the microphone's audio frequency response characteristics, comprising:

a loudspeaker having a cone;

a flexible rubberized silk diaphragm mounted to a rigid mounting ring;

a substantially acoustically transparent rigid web-like frame disposed between and mechanically coupling said loudspeaker and said diaphragm so that said cone and said diaphragm substantially bound a resonant enclosure; and an electret microphone cartridge attached to said frame within said resonant enclosure so that said microphone's audio characteristics are shaped by the resonant characteristics of the resonant enclosure.

15. A method of mounting a microphone, comprising the steps of:

attaching a microphone cartridge to a web-like rigid frame;

covering a first surface of said frame with a flexible diaphragm; and placing a loudspeaker adjacent another surface of said frame to enclose said microphone within an enclosure bounded by said diaghragm and the cone of said loudspeaker.

16. The method of claim 15, wherein said covering step and said placing step are accomplished by stacking said diaphragm, said frame mounted microphone and said speaker within a pocket of an electronic equipment housing.

17. The method of claim 16, further including the step of installing a gasket between said diaphragm and said frame.

* * * * *